United States Patent [19]
Flisch

[11] 4,008,634
[45] Feb. 22, 1977

[54] MULTISPINDLE AUTOMATIC LATHE

[75] Inventor: Hermann Flisch, Maienfeld, Switzerland

[73] Assignee: Eunipp AG, Zug, Switzerland

[22] Filed: Feb. 25, 1976

[21] Appl. No.: 661,167

[30] Foreign Application Priority Data

Mar. 14, 1975 Switzerland .................. 3274/75

[52] U.S. Cl. .................... 82/3; 29/38 B; 82/2.5
[51] Int. Cl.² ............................ B23B 9/04
[58] Field of Search .......... 82/3, 2.5, 2.7; 29/38 B, 43

[56] References Cited
UNITED STATES PATENTS

| | | | |
|---|---|---|---|
| 2,377,383 | 6/1945 | Slovak | 82/2.5 |
| 3,372,450 | 3/1968 | Worrell | 29/43 |
| 3,693,485 | 9/1972 | Maurer | 82/3 |
| 3,744,355 | 7/1973 | Flisch | 82/3 |

*Primary Examiner*—Leonidas Vlachos
*Attorney, Agent, or Firm*—Michael J. Striker

[57] ABSTRACT

A multispindle automatic lathe in which a plurality of axially movable spindle sleeves, each carrying a rotatable spindle axially immovably with respect to each sleeve, are mounted in opposite end portions of a drum, which, in turn, is mounted in transversely spaced upright supports for indexing movement about its axis, and in which an advancing mechanism is provided for each of the spindle sleeves.

8 Claims, 5 Drawing Figures

MULTISPINDLE AUTOMATIC LATHE

BACKGROUND OF THE INVENTION

The present invention relates to a multispindle automatic lathe having a drum indexable between a plurality of angularly displaced working stations and carrying a plurality of spindle sleeves mounting workpiece spindles with an advancing mechanism for each spindle sleeve.

Multispindle automatic lathes are already known which have a bed and an upright support wherein a spindle drum is indexably mounted which is provided with grippers for rod-shaped workpieces. A further support is mounted opposite the drum support and in which the individual tool carriers are mounted. The rotatable spindles mounted in the drum are respectively axially movable by means of advancing mechanism correlated to each of the working stations.

A multispindle automatic lathe of the aforementioned kind is therefore suitable for simulataneous machining of workpieces corresponding in number to the number of spindles. Since the number of spindles corresponds to the number of working stations, the number of the workpieces which can be simultaneously machined will be equal to the number of working stations of the drum.

SUMMARY OF THE INVENTION

It is an object of the present invention to increase the economy and the output of multispindle automatic lathes of the aforementioned kind.

It is a further object of the present invention to double the number of spindles in relation to the number of working stations so that twice the number of workpieces may be simultaneously machined as compared to automatic multispindle lathes known in the art.

With these and other objects in view, which will become apparent as the description proceeds, the multispindle automatic lathe according to the present invention mainly comprises a drum, opposite end portions of which are mounted in a pair of support means for indexing movement between a plurality of angularly displaced successive working stations, in which a plurality of spindle sleeves, equal in number to the plurality of working stations, is mounted in each of the end portions of the drum for movement in longitudinal direction, a turnable but axially immovable spindle being mounted in each of the spindle sleeves and each of the spindle sleeves being provided with an advancing mechanism, all of which advancing mechanisms being driven from a single shaft, and in which tool slides are correlated to each of the supports which together are mounted on a single tool slide carrier provided on one of the two supports.

A first embodiment of the multispindle automatic lathe according to the present invention, which serves for machining of elongated workpieces, is constructed in such a manner that all of the working stations are provided with tool slides, the tool slide in one of the working stations being provided with a cutting tool which is correlated to one of the supports, whereas in the other support means are provided for loading and unloading of the spindle at this station.

Another embodiment of the multispindle automatic lathe according to the present invention is constructed in such a manner that a tool slide is correlated at each working station to each of the supports, whereby one of the stations serves as a finishing machining station in which in each support a cutting tool is arranged on the correlated tool slide.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
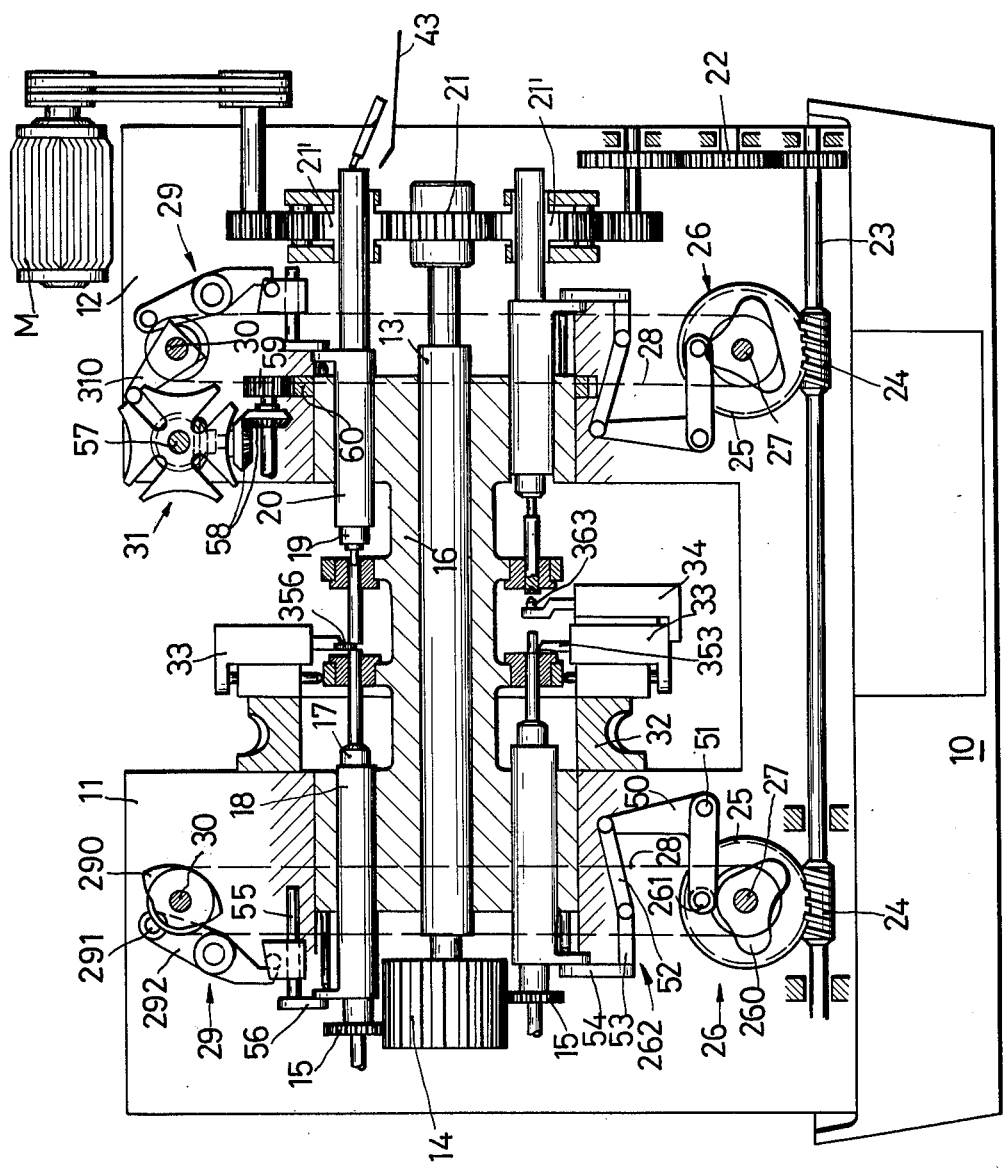
FIG. 1 is a longitudinal section through a first embodiment of a multispindle automatic lathe for the machining of long workpieces.
Figure 2:
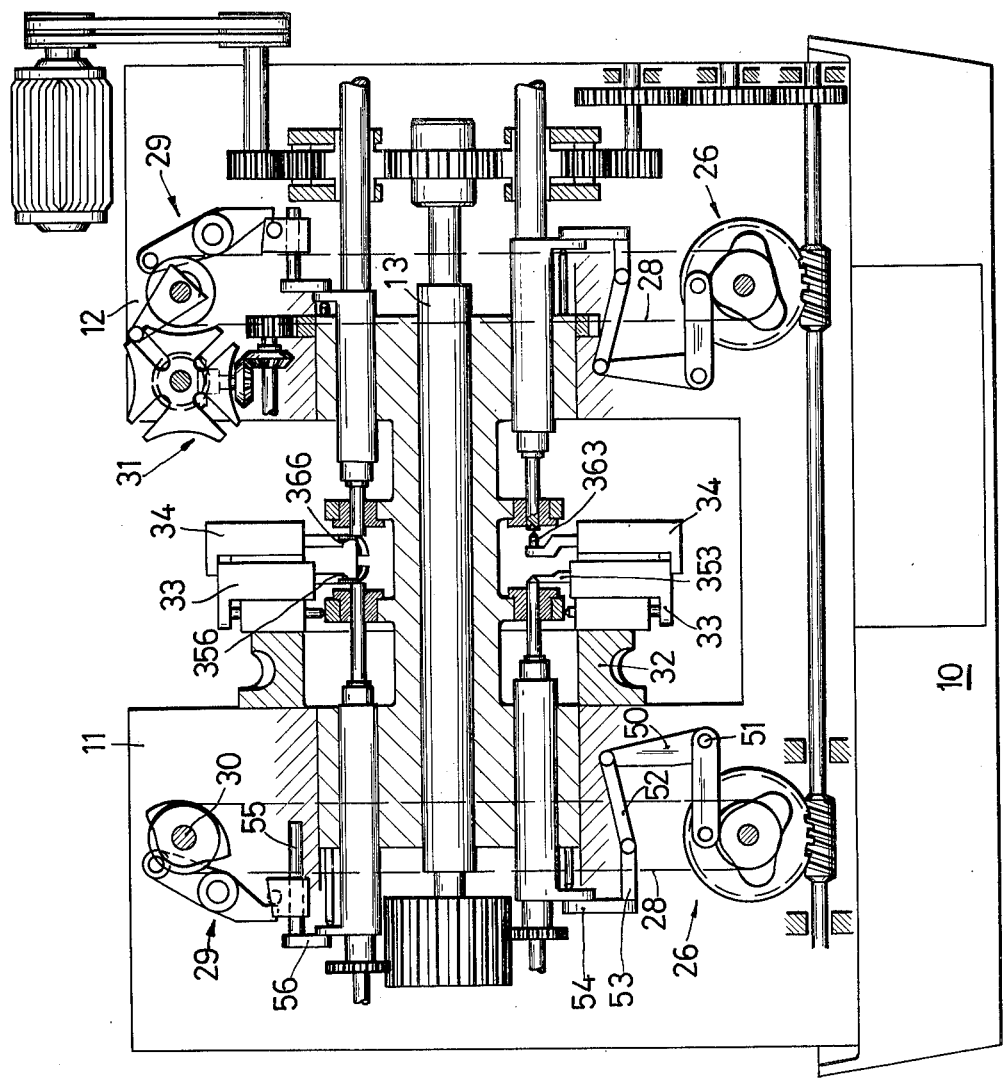
FIG. 2 is a longitudinal section through a second embodiment for simultaneously machining two workpieces in each working station.

The automatic multispindle lathe according to the present invention has a machine bed 10 on the opposite ends of which two upright supports 11 and 12 are stationarily mounted in any convenient manner. A drum 16 is indexably mounted at its opposite end portions in the supports 11 and 12. The drum 16 is provided with a central bore in which a central shaft 13 is rotatably mounted which is driven from a motor M over a belt drive and gears 21' and 21 as shown in FIGS. 1 and 2. A gear 14 of relatively great axial length is mounted on one end of the central shaft which is in mesh with two gears 15 of relatively small axial length which drive spindles 17 turnably mounted in spindle sleeves 18, which in turn are mounted for movement in axial direction in one of the end portions, shown in FIGS. 1 and 2 as the left end portion of the one-piece drum 16. The drive of additional spindles 19, which are mounted in spindle sleeves 20 in the right end of the drum 16, is carried out by means of the gears 21 and 21' which also drive the central shaft 13. The spindle sleeves 18 and 20 for the spindles 17 and 19 are mounted in the drum 16 movable in longitudinal direction, but not turnably with respect to the drum, whereas the spindles 17 and 19 are mounted in the spindle sleeves 18 and 20 rotatable but axially immovably.

The axial movement of the spindle sleeves 18 and 20 and therewith of the spindles 17 and 19 mounted axially immovably therein, is carried out from the motor M over the above-mentioned gears 21' and 21 and a further gear drive 22 which drives an additional shaft 23 on which two worms 24 are mounted for rotation therewith. One of the worms 24 is provided for the spindles 17 in the spindle sleeves 18 mounted in the upright support 11 and the other worm 24 is provided for the spindles 19 mounted in the spindle sleeves 20 located in the upright support 12. Each of the worms 24 drives over a worm gear 25 three advancing mechanisms 26. Such an advancing mechanism comprises a cam disc 260 turnably mounted on a shaft 27, a roller follower 261 engaging the cam 260 and a linkage 262 connecting the roller follower 261 with the respective spindle sleeve. Each linkage 262 comprises a crank 50 tiltably mounted about a fixed pivot 51 and carrying on one end of one crank arm the roller follower 261, whereas the free end of the other crank arm is pivotally connected to a link 52 which in turn is connected to a rod 53 guided for movement in longitudinal direction in the upright support 11 and provided at its outer end with an upwardly extending member 54 adapted to engage a downwardly extending projection on the respective spindle sleeve 18 or 20. The above-described six advancing mechanisms 26, that is three for each of the upright supports, are correlated to the lower working stations, that is the working stations located below a horizontal plane passing through the axis of the shaft 13. The mentioned advancing mechanisms 26 act on those spindle sleeves 18, respectively 20, which are located below the aforementioned plane and move the spindle sleeves in axial direction. Each of the three cam discs 26 may have a different configuration and can be mounted relative to the other cam discs on each shaft 27 in any desired angular relationship. A chain drive 28 connects each of the shafts 27 with three analogous advancing mechanisms 29 on the upper portions of each of the upright supports 11 and 12. Each of the advancing mechanisms 29 comprises a cam disc 290 keyed to the shaft 30, a roller follower 291 mounted on one end of a double-armed lever 292, the other end of which is pivotally connected to a pin 55 guided for movement in longitudinal direction in the respective support and having at its outer end a downwardly projecting member 56 adapted to engage an upwardly projecting portion of the respective spindle sleeves 18 and 20 located in the upper stations of the two supports 11 and 12 to thus move the spindle sleeves and the spindles mounted therein in axial direction.

The drum 16 is indexed about its axis by a maltese-cross transmission comprising a maltese cross 31 having a plurality of slots into which an end portion of a lever 310 is engageable. The lever 310 is fixed at the other end thereof to a shaft 30 turnably mounted in the support 12 and driven over the aforementioned chain drive 28. The shaft 57 on which the maltese cross 31 is mounted is connected through pairs of bevel gears 58 and a spur gear 59 to a gear 60 fixed to an end portion of the drum 16 for rotation of the latter.

Figure 3:
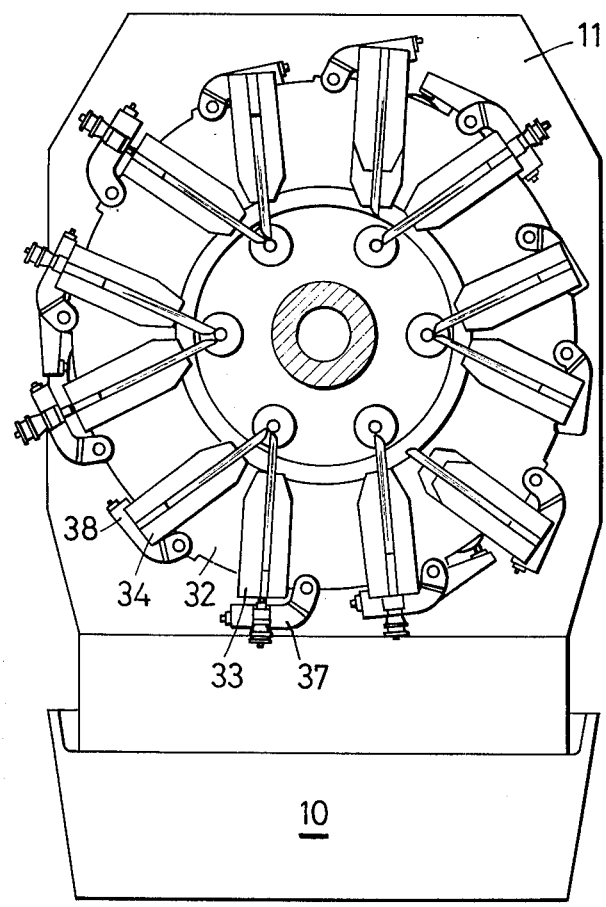
FIG. 3 is a schematic end view of the tool slide carrier.
Figure 4:
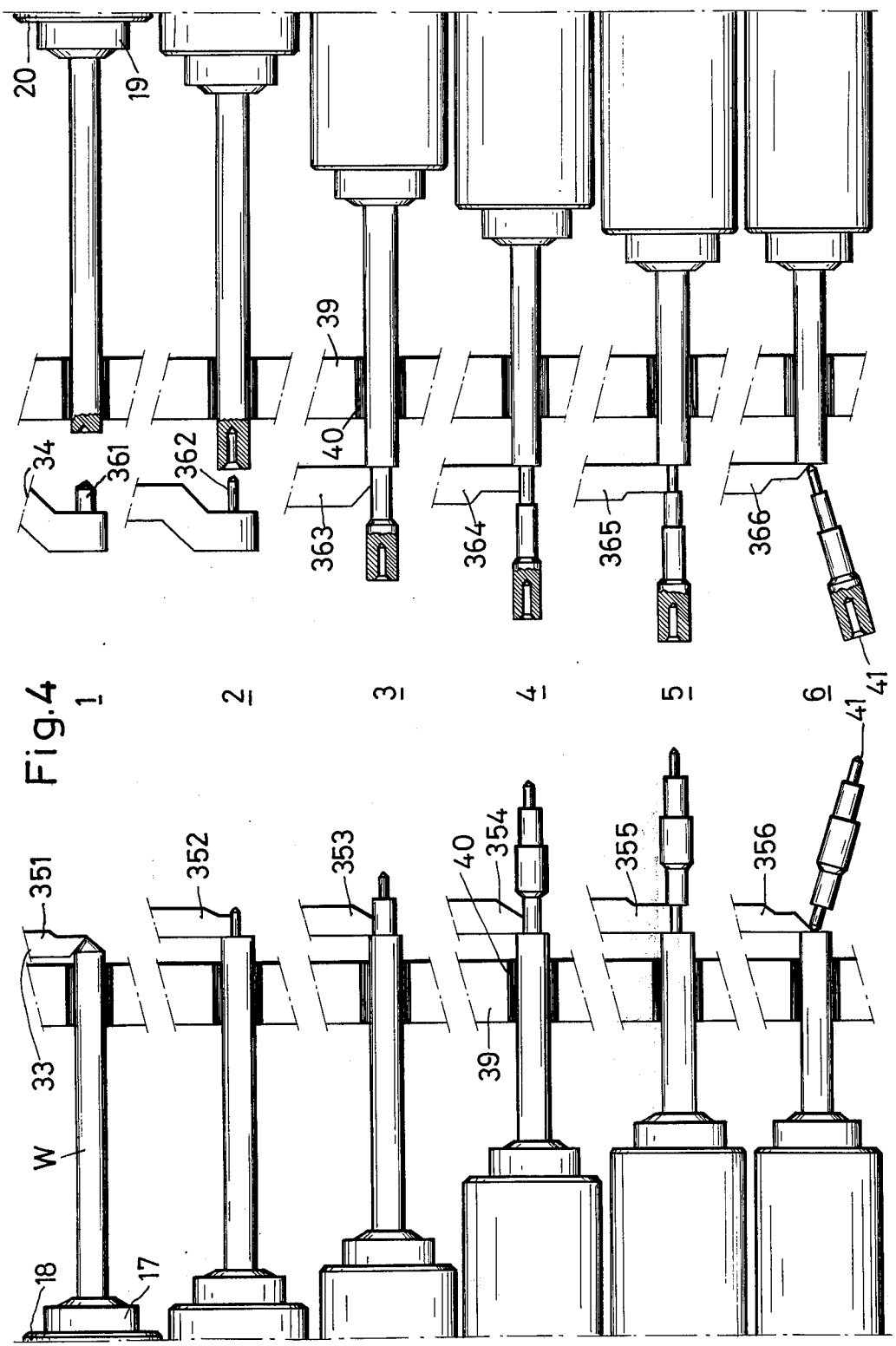
FIG. 4 schematically illustrates the operating cycle of the embodiment according to FIG. 2.
Figure 5:
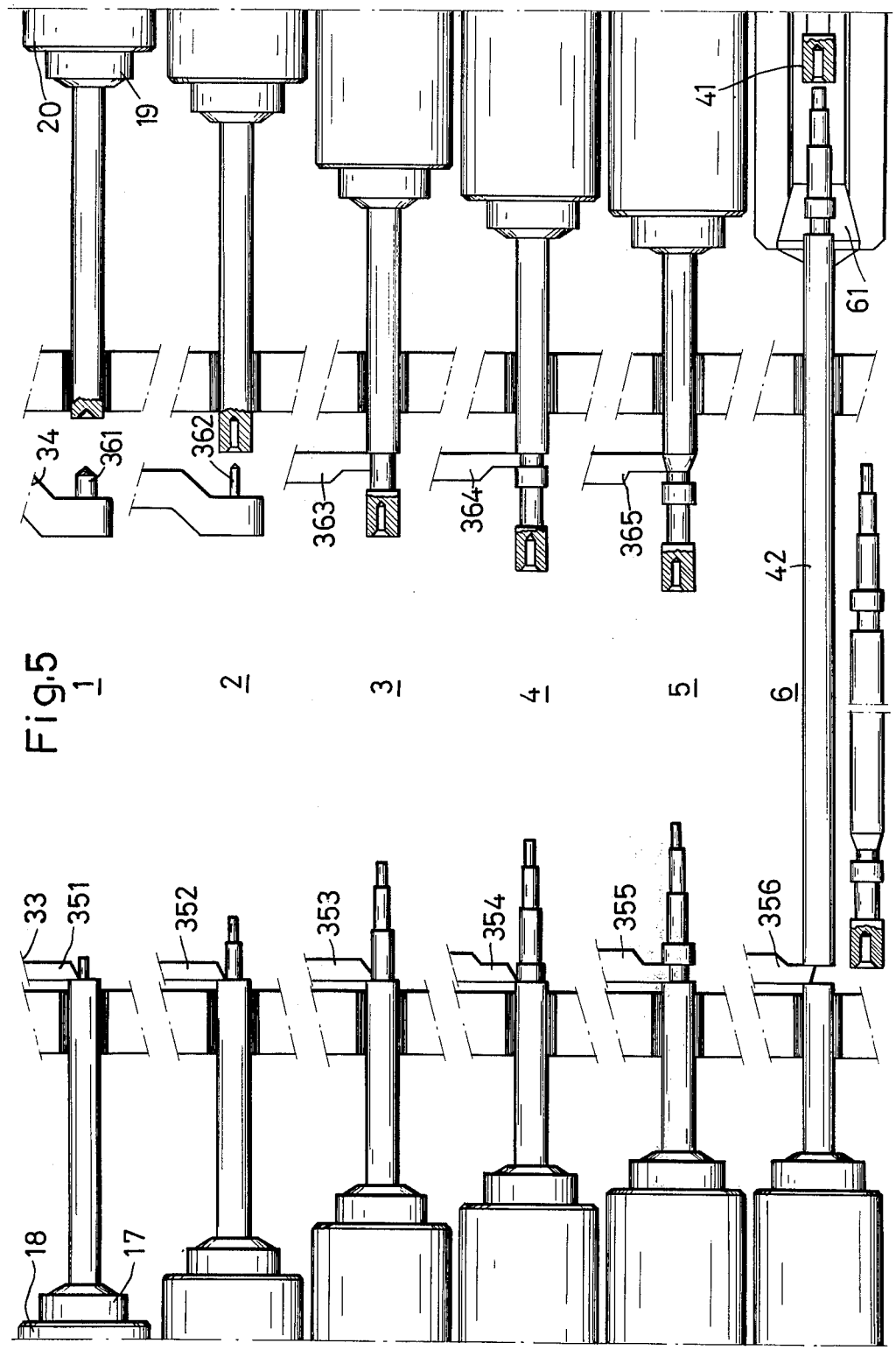
FIG. 5 schematically illustrates the operating cycle for the embodiment shown in FIG. 1.

The multispindle automatic lathe is also provided with a tool slide carrier 32. The tool side carrier 32 carries for each station 1-6, except for the station 6 of the embodiment illustrated in FIG. 1, two radially movable tool slides 33 and 34 with tools 351 to 356, respectively 361 to 366 (FIGS. 4 and 5). The tools 351–356 in the tool slides 33 serve to machine the workpiece which are advanced with the spindles 17 in the support 11, whereas the tools 361–366 of the tool slides 34, which are axially offset with respect to the slides 33, serve for machining the workpieces moving with the spindles 19 in the support 12. The tool slide carrier 32 is mounted on one of the supports, for instance the support 11 as shown in FIGS. 1 and 2. The drive of the radially movable tool slides 33 and 34 is performed in a known manner not illustrated in the drawing, but for instance disclosed in the U.S. Pat. No. 3,744,355, to which reference may be had with regard to the means for moving these tool slides. Such drive may comprise a gear ring coaxially fixed to the drum 16 which drives a plurality of pinions which in turn cause the forward and rearward movements of the tool slides 33 and 34 via levers 37, respectively 38 (FIG. 3).

The operation of the two embodiments of the multispindle automatic lathe respectively illustrated in FIGS. 1 and 2 and their differences from each other will, now be described in connection with FIGS. 1 and 5.

In both Figures the stations 1–6 with the spindle sleeves 18, respectively 20, and the spindle 17, respectively 19, are shown in a developed view. It is assumed that in FIG. 4 an elongated workpiece W is moved by the spindle 17, respectively 19, in such a position that the portion of the workpiece projecting beyond the guide ring 39 provided with guide bushings 40 may be machined by the tools 351, respectively 361. In the support 11, that is at the left side of FIG. 4, the end of the rod-shaped workpiece is tapered, whereas the rod-shaped workpiece in the spindle 19 is provided by means of the tool 361 with a conical center. Each workpiece 41 is then transferred during indexing of the drum 16 to the station 2 and is then further advanced by the spindle 17, respectively 19, whereafter, by means of the tools 352, respectively 362 a further machining is carried out (on the workpiece in the spindle 17 a turning operation and in the workpiece of the spindle 19 a boring operation). During further indexing of the drum 16, each workpiece is stepwise transmitted through the stations 3-5 and finally to station 6. The tools 356 and 366 at the station 6 are cut-off tools which cut off workpieces—which in the preceding stations have been machined—from the remainder of the elongated workpiece so that the finished workpieces 41 will drop in a non-illustrated container. The working cycle is then repeated in the aforementioned manner.

In the embodiment illustrated in FIG. 5, which corresponds to the embodiment illustrated in FIG. 1, the station 6 is a loading and unloading station. In the embodiment according to FIGS. 2 and 4 a workpiece feeding means is coordinated with each of the supports, whereas in the embodiment shown in FIGS. 1 and 5 only one feeding means on the side of the support 11 is provided.

In the embodiment according to FIGS. 1 and 5 a workpiece rod in the spindle 17 at station 1 is advanced so that it may be machined by the tool 351 and is subsequently in the stations 2–5 further advanced so as to be machined by the tools 352–355. During a further indexing of the drum 16 the workpiece, which is only machined at one end, is transported to the station 6. At this station the spindle 17 is so far advanced towards the right, as viewed in FIG. 5, until the workpiece rod passes through the guide ring 39 into the corresponding opposite spindle 19 in which it is gripped by the collet 61 therein. Subsequently thereto the workpiece 42 is cut off by the cut-off tool 356 of the station 6. The spindle 19 is then moved towards the right by the corresponding mechanism so that the workpiece 42 is brought during indexing of the drum to the station 1 into the position as shown. Subsequently thereto the workpiece is further machined, that is its rear end is machined in the stations 2–5 in the manner as illustrated in FIG. 5, whereafter the workpiece in its spindle 19 arrives a second time at the station 6. At this station the workpiece will be moved towards the right, as viewed in FIG. 5, by a further workpiece 42 which simultaneously has passed through the stations 1–5 and now likewise arrives at the station 6. This further workpiece 42 is moved during the advancing movement of the spindle 17 into the spindle 19 in the manner as described above and the finished workpiece 41 is thus pushed by means of the part-finished workpiece 42 towards the right through the hollow spindle 19 and falls then at the rear or outer end of the spindle into a container or into a chute 42 as shown in FIG. 1. Therefore, in the embodiment according to FIGS. 1 and 5 only a single tool slide 33 is provided in the station 6.

In the embodiment illustrated in FIGS. 2 and 4, twelve workpieces may be simultaneously machined, whereas in the embodiment shown in FIGS. 1 and 4 only 11 workpieces are simultaneously machined since one of the stations serves as a loading and unloading station.

It will be understood that each of the elements described above, or two or more together, may also find a useful application in other types of automatic multispindle lathes differing from the types described above.

While the invention has been illustrated and described as embodied in an automatic multispindle lathe having an increased output, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In an automatic multispindle lathe, a combination comprising a drum having an axis and a pair of opposite end portions; a pair of support means supporting said drum on said opposite end portions for indexing movement about its axis between a plurality of angularly displaced successive work stations; a plurality of spindle sleeves equal in number to said plurality of working stations mounted in each of said end portions of said drum for movement in longitudinal direction; a spindle turnably but axially immovably mounted in each of said spindle sleeves; a plurality of advancing means, one for each of said spindle sleeves; a driven shaft; transmission means between said driven shaft and said plurality of advancing means for driving all of said advancing means from said driven shaft; a plurality of tool slides; and a single tool slide carrier mounted on one of said support means and supporting said plurality of tool slides for movement in radial direction.

2. A combination as defined in claim 1, wherein two tool slides are provided for each working station with the exception of one in which only a single tool slide carrying a cut-off tool is coordinated with one of the spindles located at this one working station, whereas the other spindle located at the same time at this one working station serves only for loading and unloading a workpiece into and from said other spindle.

3. A combination as defined in claim 1, wherein for each of said working stations a pair of tool slides is provided, and wherein in one of said working stations each of the pair of tool slides provided therefor carries a cut-off tool.

4. A combination as defined in claim 1 and including a further driven shaft rotatably mounted in said drum coaxially therewith, and transmission means connecting said further driven shaft to said spindles for rotating all of said spindles by said further driven shaft.

5. A combination as defined in claim 4, wherein said transmission means between said further driven shaft and said spindles comprises a first gear of relatively large axial length fixed to said further driven shaft for rotation therewith and a second gear of relatively small axial length fixed to each of said spindles and each meshing with said first gear.

6. A combination as defined in claim 2, wherein the spindle sleeves and the spindles mounted therein in one of said end portions of said drum are axially aligned with those in the other end portion, and wherein the advancing means for the spindle sleeves in said one working station are coordinated with each other in their movements in such a manner that a partially finished workpiece carried at said one station by the spindle in one of said end portions of the drum is transmitted to the axially aligned spindle mounted in the spindle sleeve in the other end portion while simultaneously pushing out a finished workpiece from said axially aligned spindle.

7. A combination as defined in claim 1, wherein each of said advancing means comprises a cam rotatable about a fixed axis and having a cam face, a cam follower engaging said cam face and linkage means between said cam follower and the respective spindle sleeve.

8. A combination as defined in claim 1, and including indexing means for stepwise indexing said drum about its axis between the various stations, and including a maltese cross provided with a plurality of radially extending slots, an arm mounted at one end rotatably about a fixed axis and engageable with an opposite end portion in said slots, and further comprising transmission means between said driven shaft and said arm for rotating said arm about said fixed axis.

* * * * *